(12) United States Patent
Henry et al.

(10) Patent No.: US 12,337,425 B2
(45) Date of Patent: Jun. 24, 2025

(54) ARC WELDING ADJUSTABLE SHORT CIRCUIT THRESHOLD

(71) Applicant: Lincoln Global, Inc., Santa Fe Springs, CA (US)

(72) Inventors: Judah B. Henry, Painesville, OH (US); Steven R. Peters, Huntsburg, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 966 days.

(21) Appl. No.: 17/465,319

(22) Filed: Sep. 2, 2021

(65) Prior Publication Data

US 2023/0061003 A1  Mar. 2, 2023

(51) Int. Cl.
  *B23K 9/095* (2006.01)
  *B23K 9/073* (2006.01)
(52) U.S. Cl.
  CPC ............ *B23K 9/0953* (2013.01); *B23K 9/073* (2013.01); *B23K 9/0956* (2013.01)
(58) Field of Classification Search
  CPC ........ B23K 9/00; B23K 9/095; B23K 9/0953; B23K 9/073; B23K 9/0956; B23K 9/06
  USPC .............. 219/121.11, 130.4, 130.31, 130.21, 219/130.01, 137 R
  See application file for complete search history.

(56) References Cited

U.S. PATENT DOCUMENTS

| | | | |
|---|---|---|---|
| 6,359,258 B1 | 3/2002 | Blankenship et al. | |
| 6,596,970 B2 | 7/2003 | Blankenship et al. | |
| 10,071,434 B2 | 9/2018 | Chantry et al. | |
| 10,118,243 B2 | 11/2018 | Peters et al. | |
| 2010/0224607 A1* | 9/2010 | Hutchison | B23K 9/0953 219/136 |
| 2010/0308026 A1 | 12/2010 | Vogel | |
| 2013/0264323 A1 | 10/2013 | Daniel | |
| 2018/0036824 A1* | 2/2018 | Peters | B23K 9/1062 |
| 2020/0070270 A1 | 3/2020 | Davidson et al. | |
| 2020/0130093 A1 | 4/2020 | Henry et al. | |
| 2020/0306859 A1 | 10/2020 | Fleming et al. | |

FOREIGN PATENT DOCUMENTS

| | | | | |
|---|---|---|---|---|
| CN | 103286420 A | | 9/2013 | |
| CN | 108076632 A | * | 5/2018 | ........... B23K 26/346 |
| CN | 111215727 A | | 6/2020 | |
| EP | 2 444 191 A2 | | 4/2012 | |

* cited by examiner

Primary Examiner — Steven W Crabb
Assistant Examiner — Alba T Rosario-Aponte
(74) Attorney, Agent, or Firm — Brad C. Spencer

(57) ABSTRACT

A shielded metal arc welding system includes a stick electrode holder, a stick electrode clamped by the holder, and a welding power supply operatively connected to the holder and configured to supply a welding current to the electrode through the holder. The power supply includes a memory storing both of a short circuit threshold voltage level and an arcing threshold voltage level. A welding voltage level is detected during an initial shorting of the electrode to a workpiece for commencing a welding operation. Both of the short circuit threshold voltage level and the arcing threshold voltage level are adjusted based on the detected welding voltage level. A short circuit clearing routine is activated when the welding voltage level is equal to or less than the adjusted short circuit threshold voltage level, and deactivated when the welding voltage level is equal to or greater than the adjusted arcing threshold voltage level.

13 Claims, 7 Drawing Sheets

ARC WELDING ADJUSTABLE SHORT CIRCUIT THRESHOLD

BACKGROUND OF THE INVENTION

Field of the Invention

The present invention relates to arc welding systems, and in particular to a short circuiting response implemented by a welding power supply when a consumable electrode shorts to a workpiece.

Description of Related Art

Welding power supplies typically employ a short circuit clearing routine when a short circuit between a consumable welding electrode and a workpiece is sensed. The welding power supply senses the short circuit by monitoring the welding voltage. When the welding voltage drops below a short circuit threshold voltage level, thereby indicating a short circuiting of the consumable welding electrode to the workpiece, the welding power supply initiates the short circuit clearing routine, such as increasing the welding current until the short circuit clears. Short circuit clearing routines can be executed during various welding processes, such as shielded metal arc welding (SMAW), gas metal arc welding (GMAW), flux-cored arc welding (FCAW), metal-cored arc welding (MCAW), submerged arc welding (SAW), etc. If the welding circuit between the welding power supply and the workpiece includes an unexpectedly large resistance, such as due to long welding cables or poor electrical connections, the welding power supply may not properly determine the occurrence short circuits between the consumable electrode and the workpiece. For example, a large voltage drop along the welding cables will lead to a higher than expected short circuit voltage level. If the threshold voltage level employed by the welding power supply for determining a short circuit condition is less than the voltage drop along the welding cables, the power supply will not recognize the short circuit and will not activate the short circuit clearing routine. This can lead to spatter or a tendency for the electrode to stub to the molten weld puddle. It would be beneficial if the welding power supply could recognize when the welding circuit includes a large resistance, and adjust when the short circuit clearing routine activates and deactivates accordingly.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is an arc welding method. The method includes the step of providing a shielded metal arc welding system. The shielded metal arc welding system includes a stick electrode holder, a stick electrode clamped by the stick electrode holder, and a welding power supply operatively connected to the stick electrode holder and configured to supply a welding current to the stick electrode through the stick electrode holder. The welding power supply includes a memory storing both of a short circuit threshold voltage level and an arcing threshold voltage level. The method further includes the step of detecting, by the welding power supply, a welding voltage level during an initial shorting of the stick electrode to a workpiece for commencing an arc welding operation. The welding power supply adjusts both of the short circuit threshold voltage level and the arcing threshold voltage level based on the detected welding voltage level. The welding power supply activates a short circuit clearing routine during the arc welding operation when the welding voltage level is equal to or less than the adjusted short circuit threshold voltage level. The welding power supply deactivates the short circuit clearing routine when the welding voltage level is equal to or greater than the adjusted arcing threshold voltage level.

In accordance with another aspect of the present invention, provided is an arc welding system. The system includes a stick electrode holder comprising a clamp for holding a stick electrode. A welding power supply is operatively connected to the stick electrode holder via a cable. The welding power supply is configured to supply a welding current to the stick electrode through the stick electrode holder and cable. The welding power supply includes a memory storing both of a short circuit threshold voltage level and an arcing threshold voltage level, a controller operatively connected to the memory, and a voltage sensor, operatively connected to the controller, that measures a welding voltage level during an arc welding operation. The welding power supply is configured to detect the welding voltage level during an initial shorting of the stick electrode to a workpiece for commencing a the arc welding operation, automatically adjust both of the short circuit threshold voltage level and the arcing threshold voltage level based on the welding voltage level detected during the initial shorting of the stick electrode to the workpiece, activate a short circuit clearing routine during the arc welding operation when the welding voltage level is equal to or less than the adjusted short circuit threshold voltage level, and deactivate the short circuit clearing routine when the welding voltage level is equal to or greater than the adjusted arcing threshold voltage level.

In accordance with another aspect of the present invention, provided is arc welding system. The system includes a welding torch, a consumable electrode extending from the welding torch, and a welding power supply operatively connected to the welding torch via a cable. The welding power supply is configured to supply a welding current to the consumable electrode through the welding torch and cable. The welding power supply includes a memory storing a short circuit threshold voltage level or a short circuit threshold resistance level, a controller operatively connected to the memory, and a voltage sensor, operatively connected to the controller, that measures a welding voltage level during an arc welding operation. The welding power supply is configured to detect the welding voltage level during a shorting of the consumable electrode to a workpiece, automatically adjust the short circuit threshold voltage level or the short circuit threshold resistance level based on the welding voltage level detected during the shorting of the consumable electrode to the workpiece, and activate a short circuit clearing routine during the arc welding operation when the welding voltage level is equal to or less than the adjusted short circuit threshold voltage or when a welding circuit resistance level is equal to or less than the adjusted short circuit threshold resistance level.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
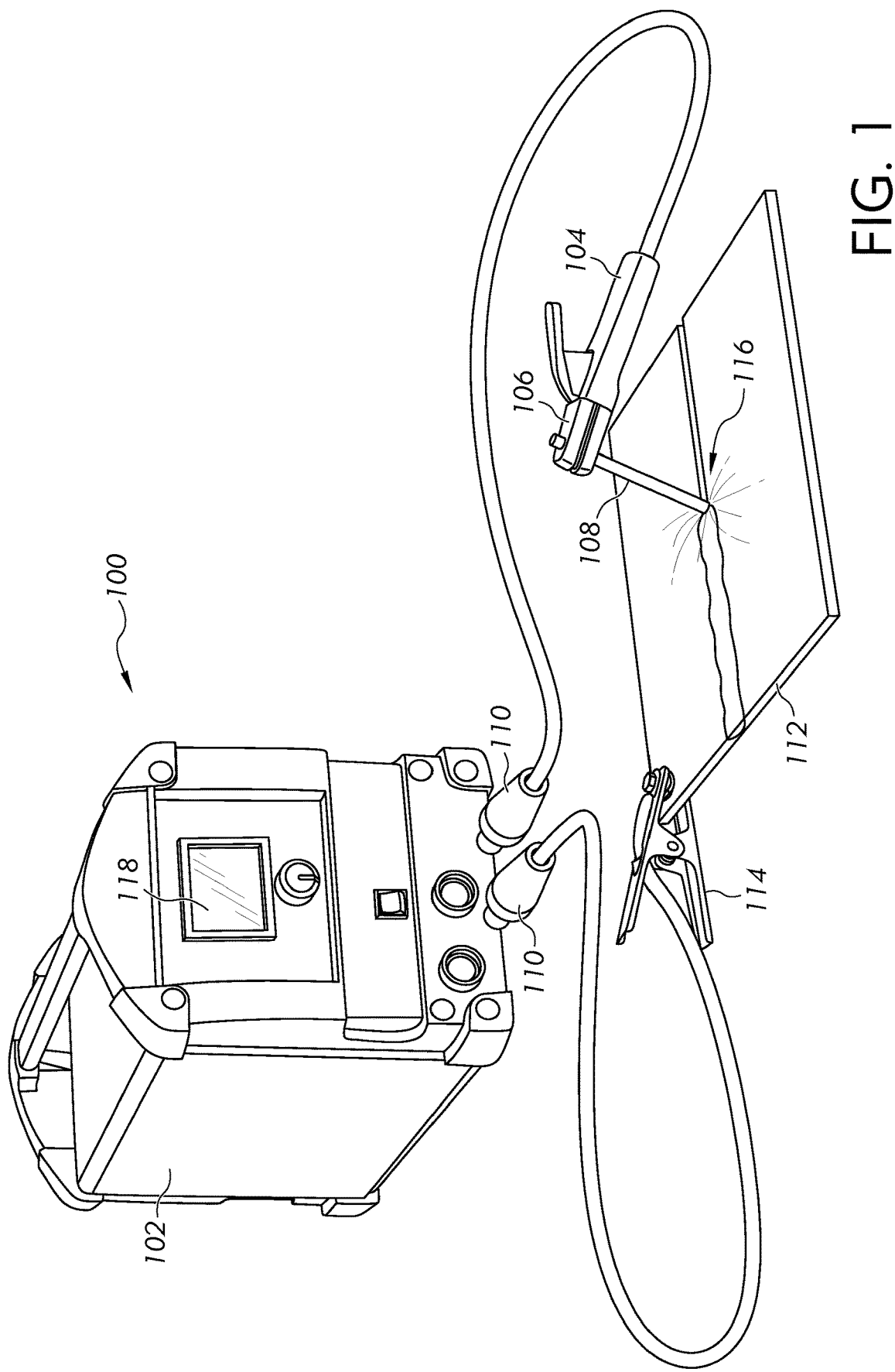
FIG. 1 shows an arc welding system.

The present invention relates to arc welding systems, and in particular arc welding power supplies, that employ a short circuit clearing routine for clearing a short circuit between a consumable welding electrode and a workpiece. The activating and deactivating thresholds of the short circuit clearing routine are adjusted based on the detected welding voltage during a short circuit or the resistance of the welding circuit. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

While embodiments of the present invention described herein are discussed in the context of a shielded metal arc welding (SMAW) system, other embodiments of the invention are not limited thereto. For example, embodiments can be utilized in gas metal arc welding (GMAW), flux-cored arc welding (FCAW), metal-cored arc welding (MCAW), submerged arc welding (SAW) as well as other similar types of welding operations. Further, embodiments of the present invention can be used in manual, semi-automatic and robotic welding operations. Embodiments of the present invention can also be used in metal deposition operations that are similar to welding, such as additive manufacturing. As used herein, the term "welding" is intended to encompass all of these technologies as they all involve material deposition to either join or build up a workpiece. Therefore, in the interests of efficiency, the term "welding" is used below in the description of exemplary embodiments, but is intended to include all of these material deposition operations, whether or not joining of multiple workpieces occurs.

Referring now to the drawings, FIG. 1 shows an example SMAW arc welding system 100. The welding system 100 includes welding power supply 102. The welding power supply 102 is operatively connected to a welding torch. In FIG. 1, the welding torch is a stick electrode holder 104 having a clamp 106 that holds a stick electrode 108 extending from the torch. In further embodiments, such as in a GMAW system, the torch could be a welding gun through which a consumable wire electrode is fed. In either case, the welding power supply 102 supplies welding current and voltage to the electrode 108 through the torch and supply/grounding cables 110. The welding current and voltage generate a welding arc 116 between the stick electrode 108 and one or more workpieces 112 to perform a welding operation on the workpiece. A grounding clamp 114 and cable 110 provides a return path for the welding current from the workpiece 112 to the welding power supply 102. The welding power supply 102, cables 110, electrode holder 104, electrode 108, welding arc 116 between the electrode and workpiece 112, the workpiece itself, and the grounding clamp 114 form a welding circuit. At times, such as when scratch or lift starting the electrode 108 to the workpiece 112 to initiate the welding arc 116, the electrode will be shorted to the workpiece and no arc will be present. The electrode 108 may also become accidentally shorted to the weld pool or workpiece 112 during active welding, which extinguishes the arc 116. During these transient periods of the welding operation, when the electrode 108 is shorted to the workpiece 112, the welding arc 116 and arc voltage are absent from the welding circuit.

In certain embodiments, the welding power supply 102 can be a multi-process power supply capable of performing more than one welding process, such as both SMAW and GMAW arc welding, or SMAW, GMAW and additional welding processes such as gas tungsten arc welding (GTAW), FCAW, etc. The welding power supply 102 includes a user interface 118 through which a user can view and adjust various settings and parameters of the welding process (e.g., welding voltage and/or current level, waveform parameters, trim setting, slope or inductance settings, etc.) One of ordinary skill in the art will be familiar with the various welding parameters that could be available for adjustment via the user interface 118 and, thus, such parameters need not be discussed in detail herein. The welding system 100 shown in FIG. 1 is a manual welding system. However, the welding system could be an automated system, such as a robotic welding system, and the present invention is not limited to manual welding systems.

Figure 2:
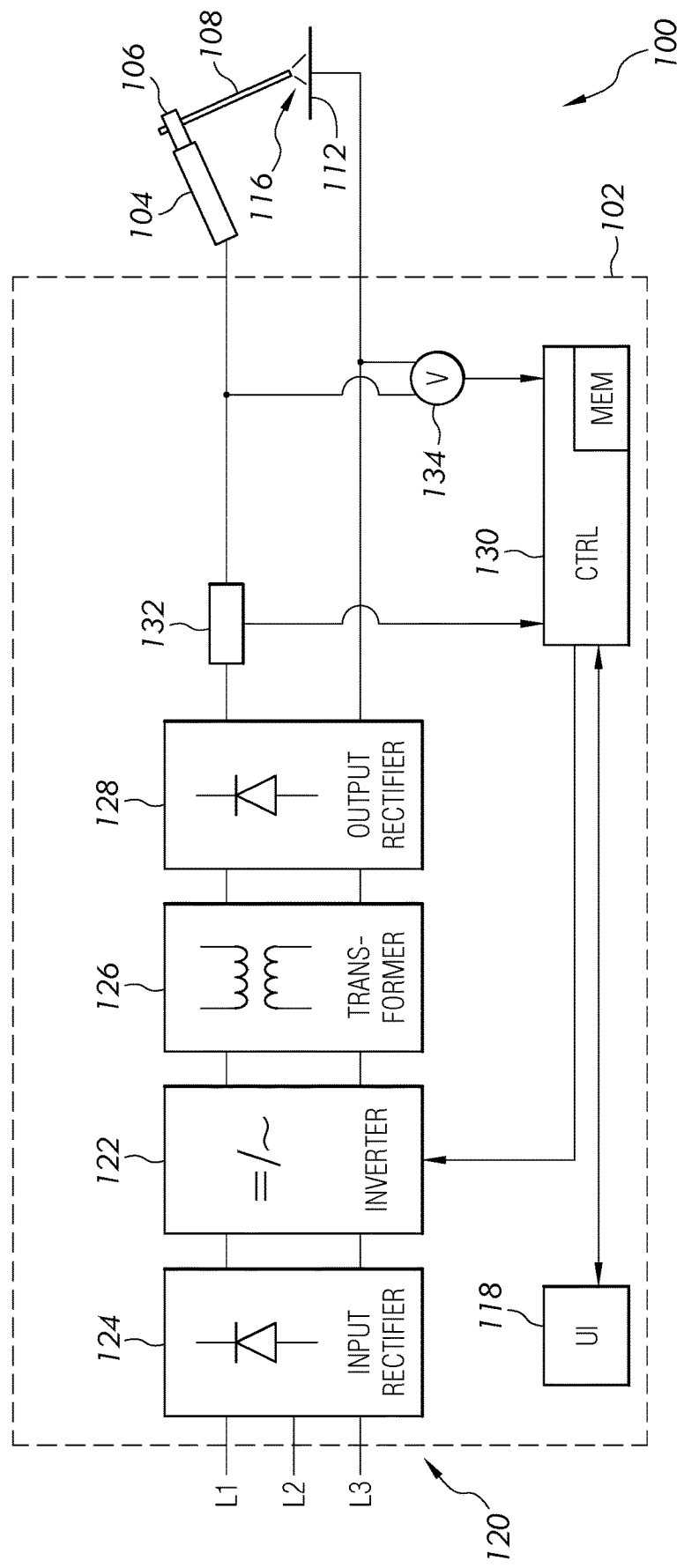
FIG. 2 is a block diagram of the arc welding system.

FIG. 2 shows a schematic block diagram of the arc welding system 100 and an example welding power supply 102. The power supply 102 generates welding current and voltage, which is supplied to the electrode holder 104 and electrode 108 to generate the welding arc 116 to perform the welding operation. The welding power supply 102 receives electrical energy for generating the arc 116 from a power source 120, such as a commercial power source or a generator. The power source 120 can be a single phase or three phase power source. In certain embodiments, the arc welding system 100 can be a hybrid system that includes one or more batteries (not shown) that also supply energy to the welding power supply 102. The welding power supply 102 can include a switching type power converter such as an inverter 122 for generating the arc 116 according to a desired welding voltage, current, waveform, etc. Alternatively or additionally, the welding power supply 102 could include a DC chopper (not shown) or boost converter (not shown) for generating welding waveforms. AC power from the power source 120 is rectified by an input rectifier 124. The DC output from the rectifier 124 is supplied to the inverter 122. The inverter 122 supplies high-frequency AC power to a transformer 126, and the output of the transformer is converted back to DC by an output rectifier 128. The output rectifier 128 supplies welding current to a welding gun or torch 104 that is operatively connected to the power supply 102. The torch 104 can have an electrode clamp or contact tip for transferring the electrical energy supplied by the power supply 102 to the electrode 108. The power supply components shown in FIG. 2 are merely exemplary, and one of ordinary skill in the art will appreciate that the welding power supply 102 could have various configurations suitable for converting power from the power source 120 into a desired welding current or waveform to perform a welding operation. For example, the welding power supply 102 need not be inverter-based as shown in FIG. 2.

The arc welding system 100 can be configured for direct current electrode positive (DC+) or "reverse" polarity wherein the torch 104 and electrode 108 are connected to a positive lead from the power supply 102, and the workpiece 136 is connected to a negative lead. Alternatively, the arc welding system 100 can be configured for direct current electrode negative (DC−) or "straight" polarity, wherein the grounding clamp 114 and workpiece 112 are connected to the positive lead and the torch 104 and electrode 108 are connected to the negative lead. Further, the arc welding system 100 can be configured for AC welding in which AC waveforms are provided to the torch 104, electrode 108, and workpiece 112.

The power supply 102 includes a controller 130 operatively connected to the inverter 122 for controlling the welding voltage, current, welding waveforms, etc. generated by the power supply. The controller 130 can provide a control signal to the inverter 122 to control its output. The controller 130 controls the output of the inverter 122 via the control signal, to achieve a desired welding voltage, current, welding waveform, etc. The control signal can comprise a plurality of separate control signals for controlling the operation of various switches (e.g., transistor switches) within the inverter 122. The controller 130 and the user interface 118 communicate bidirectionally to provide both user inputs and outputs at the user interface. The controller 130 monitors aspects of the welding operation via feedback signals. For example, a current sensor, such as a current transformer (CT) or shunt 132, can provide a welding current feedback signal to the controller 130, and a voltage sensor 134 can provide a welding voltage feedback signal to the controller. During the arc welding operation, the current sensor 132 measures the welding current level and the voltage sensor 134 measures the welding voltage level, and both of these measured levels are provided to the controller 130 as feedback. It can be seen that the measured welding voltage reflects the welding voltage level at the output of the welding power supply 102, and not the arc voltage or the voltage between the electrode 108 and the workpiece 112 (due to the existence of voltage drops in the welding circuit, such as along the cables 110).

The controller 130 can be an electronic controller and may include a processor. The controller 130 can include one or more of a microprocessor, a microcontroller, a digital signal processor (DSP), an application specific integrated circuit (ASIC), a field-programmable gate array (FPGA), discrete logic circuitry, or the like. The controller 130 can include a memory portion (e.g., RAM or ROM) storing program instructions that cause the controller to provide the functionality ascribed to it herein. The memory can be integral to the controller 130 or otherwise operatively connected to the controller. The controller 130 can include a plurality of physically separate circuits or electronic devices, such as a processor in combination with separate comparators, logic circuits, etc. However, for ease of explanation, the controller 130 is shown as a monolithic device.

The welding power supply 102, power cable 110, electrode holder 104 or torch, electrode 108, welding arc 116, workpiece 112, grounding clamp 114, and return cable 110 form a welding circuit. Short circuiting of the electrode 108 to the workpiece 112 or molten puddle is a common occurrence during welding. In SMAW, the electrode 108 is intentionally shorted to the workpiece 112 momentarily to generate an arc and commence the welding operation (e.g., scratch or lift starting). In GMAW, the wire electrode may be shorted to the molten puddle periodically to transfer a droplet to the puddle (e.g., short circuit transfer). During any welding operation, the electrode may be shorted to the molten puddle accidentally. The welding power supply 102 has a programmed short circuit clearing routine that is activated when a short circuit is detected, in order to prevent the electrode from stubbing or sticking to the molten puddle. The welding power supply 102 can detect short circuit events between the electrode 108 and workpiece 112 by monitoring the welding voltage and/or current, and can determine the existence of a short circuit condition from parameters such as the welding voltage level, the welding current level, a calculated resistance level, a calculated power level, etc. When the welding power supply 102 determines that the electrode 108 has shorted to the workpiece 112, it activates its short circuit clearing routine, which can include increasing the welding current in a controlled manner until the short circuit condition is cleared. The short circuit clearing routine can include increasing the welding current for a predetermined time period that is expected to be long enough to clear the short circuit condition. The welding power supply 102 can also monitor the welding voltage and/or current levels to determine when the short circuit condition has actually cleared (i.e., the welding arc 116 has been reestablished). When the short circuit condition has cleared and the welding arc 116 is reestablished, the welding power supply 102 deactivates its short circuit clearing routine and returns to a programmed response to the arc conditions.

Figure 3:
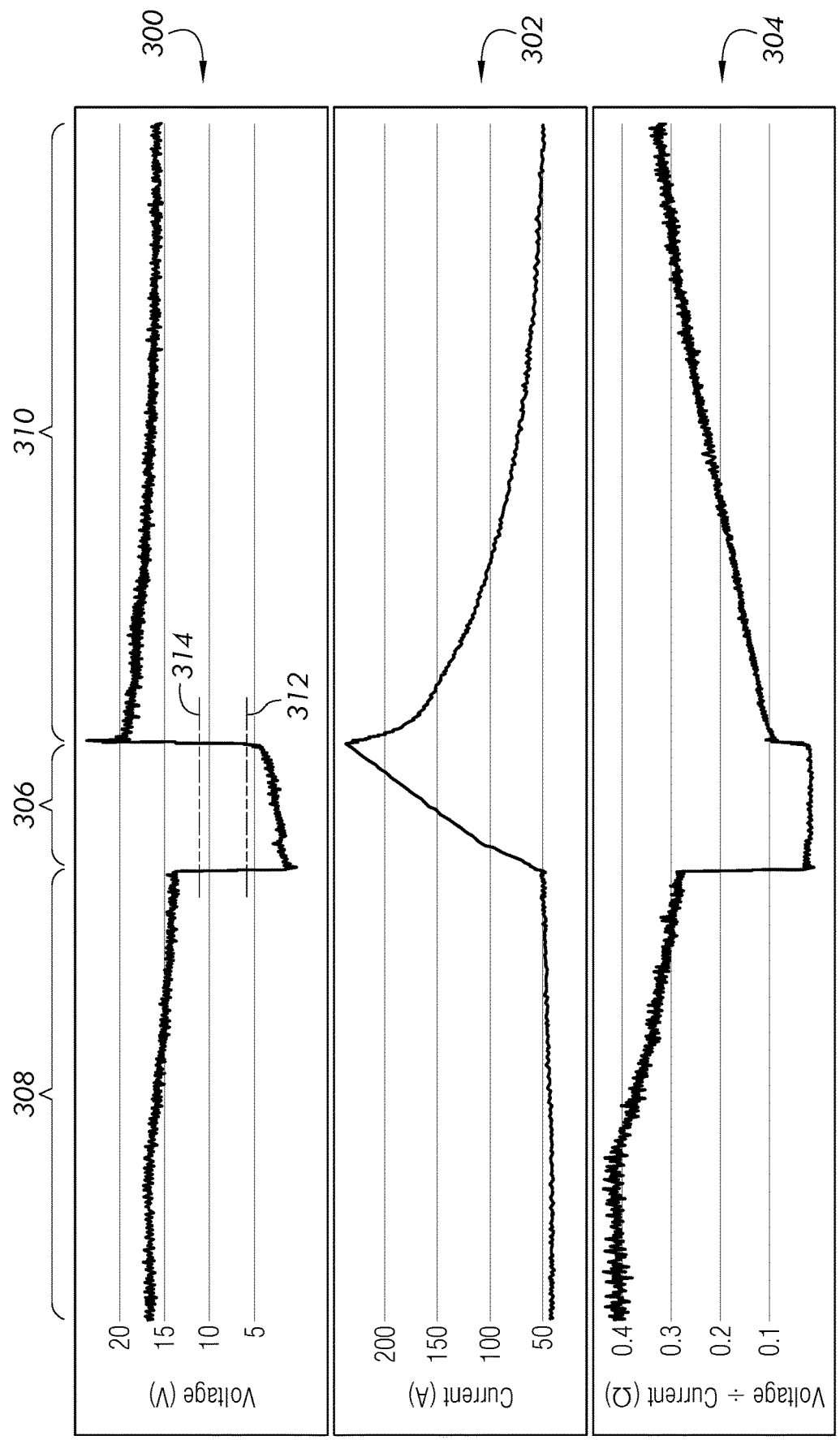
FIG. 3 shows example welding waveforms.

FIG. 3 shows example welding voltage, current, and circuit impedance ($V_S/I_S$) waveforms during welding, with an electrode short occurring during the welding operation. The upper trace 300 shows the welding voltage ($V_S$) waveform. The middle trace 302 shows the welding current ($I_S$) waveform. The lower trace 304 shows the impedance of the welding circuit ($Z_S$), which is calculated from the welding voltage and welding current. The electrode 108 is shorted to the workpiece 112 during the central portions 306 of the waveforms. It can be seen that both the voltage level and the impedance drop sharply during the short circuit condition 306. Pre-short 308 and post-short 310 arcing conditions are shown to the left and right of the short circuit condition 306, respectively. In the example shown in FIG. 3, the average welding voltage during arcing is approximately 15 V, and the average welding current is approximately 50 A. These voltage and current levels are merely exemplary and various different voltage and current levels can be used during welding depending on particular welding conditions, as would be appreciated by one of ordinary skill in the art.

As noted above, the welding power supply 102 can detect the short circuit condition 306 and activate its short circuit clearing routine when the short circuit condition occurs. In FIG. 3, the short circuit clearing routine includes ramping up the current level (e.g., from about 50 A to about 250 A) until the short is cleared. The welding power supply can determine when the short circuit condition 306 occurs and clears 310 from the measured welding voltage, the calculated circuit impedance or resistance, and/or a calculated power level. However, for ease of explanation, detecting the short circuit condition 306 and its clearing 310 will be discussed based on measurements of the welding voltage level. With respect to the example waveforms shown in FIG. 3, under normal welding conditions (e.g., using reasonably short welding cables 110 with good electrical connections such as a good grounding clamp 114 connection), the welding voltage level measured by the voltage sensor 134 in the welding power supply 102 during the short circuit condition 306 is less than 5 V, and the welding voltage level is approximately 15 V during arcing 308, 310. The memory in the welding power supply 102 stores a short circuit threshold voltage level 312 and an arcing threshold voltage level 314. When the welding voltage level monitored by the welding power supply 102 drops from the arcing voltage of about 15 V to a level equal to or below the short circuit threshold voltage level 312 (e.g., below 6 V), the welding power supply detects the short circuit condition. When the short circuit condition is detected, the welding power supply 102 activates the short circuit clearing routine and increases the welding current to reestablish the welding arc 116. The arc is subsequently reestablished at the start of the post-short arcing period 310, and the welding voltage rises quickly. When the welding voltage level monitored by the welding power supply 102 increases from the low short circuit level that is below the short circuit threshold voltage level 312 to a level equal to or greater than the arcing threshold voltage level 314 (e.g., above 11 V), the welding power supply recognizes that the arc is reestablished and deactivates the short circuit clearing routine. It can be seen in FIG. 3 that the welding current level gradually drops from a short clearing level of about 250 A to the desired welding current level of about 50 A during the post-short arcing period 310.

Figure 4:
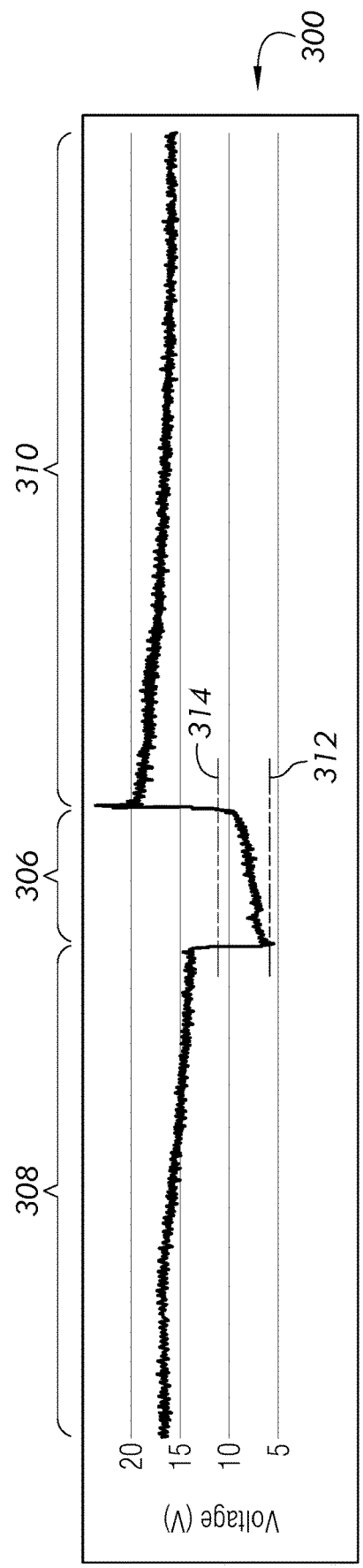
FIG. 4 shows example welding waveforms.

In some welding operations, the resistance imposed by the system set up results in additional voltage drop along the welding circuit that may impede a proper short circuiting response from the power supply 102. In particular, long welding cables 110 and poor or dirty electrical connections, such as between the grounding clamp 114 and the workpiece 112, can result in additional, undesirably large voltage drops along the welding circuit. Long coiled cables can increase the inductance in the welding circuit. If the resistance and/or inductance in the welding circuit is too high, the ability of the welding power supply 102 to accurately detect the short circuit condition 306 and activate its short circuit clearing routine will be negatively affected. This is because the voltage drop along the welding circuit, due to the circuit's high resistance/inductance level, results in a high short circuit voltage level measured by the power supply 102. The high measured short circuit voltage level may equal or exceed the stored short circuit threshold voltage level 312. This is illustrated in FIG. 4. It can be seen that the voltage level during the short circuit condition 306 is greater than 6 V due to voltage drop along the welding circuit. The voltage drop may be primarily due to the use of long welding cables 110, but it could also be due to bad or loose electrical connections, damaged cables, etc. Because the short circuit 306 voltage level exceeds the stored short circuit threshold voltage level 312, the welding power supply 102 would be unable to accurately detect short circuit conditions and activate the short circuit clearing routine.

Figure 5:
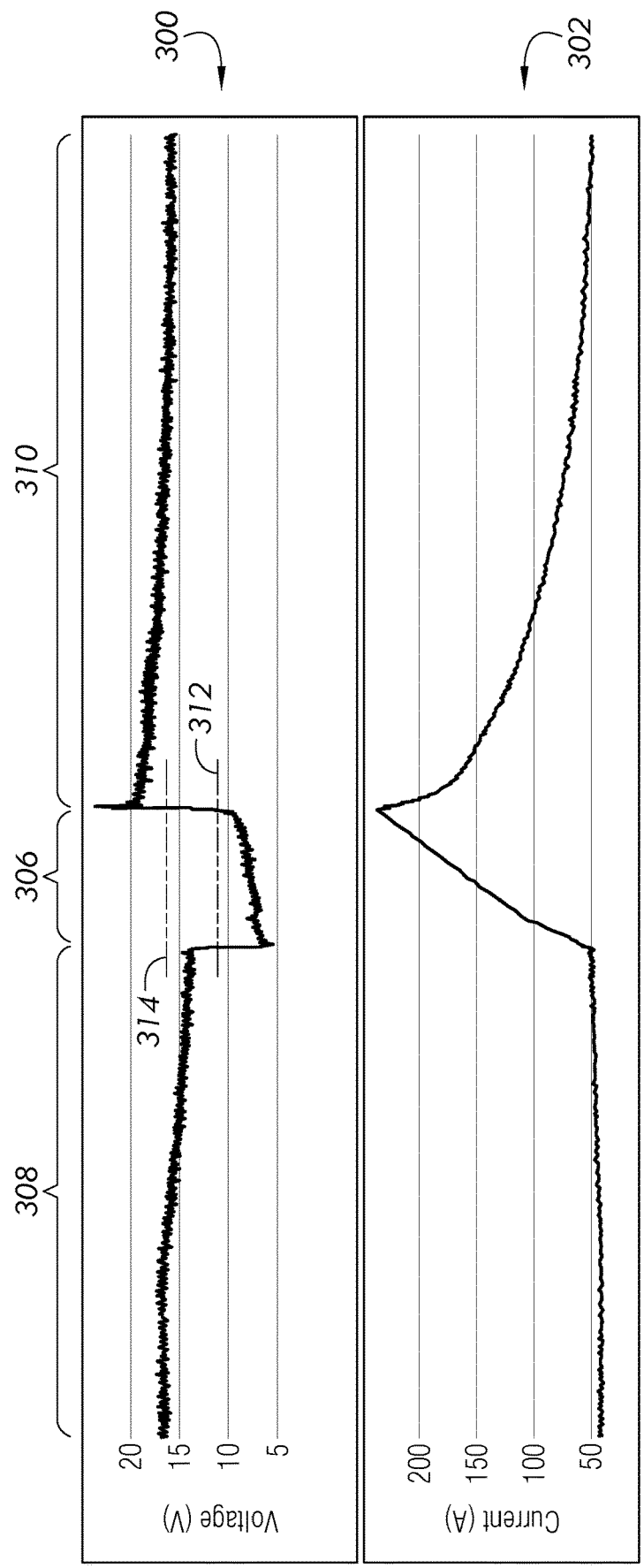
FIG. 5 shows example welding waveforms.

To address this problem, the welding power supply 102 automatically adjusts the short circuit threshold voltage level 312 upward when the measured short circuit voltage is too high (e.g., higher than expected). The welding power supply 102 can similarly adjust the arcing threshold voltage level 314 upward so that the short circuit clearing routine is not deactivated prematurely. Such adjustments are shown in FIG. 5. It can be seen that both of the short circuit threshold voltage level 312 and the arcing threshold voltage level 314 have been automatically adjusted upward by about 5 V as compared to FIG. 4, to accommodate the high short circuit voltage level during the short circuit condition 306.

As noted above, in SMAW, the stick electrode 108 is intentionally shorted to the workpiece 112 momentarily to generate an arc and commence the welding operation (e.g., scratch or lift starting). The welding power supply 102 is configured to detect the welding voltage level during the initial shorting of electrode 108 to the workpiece for commencing the welding operation. The welding power supply 102 can store an expected short circuit voltage level (e.g., a voltage level less than the short circuit threshold voltage level 312, such as 5 V or less for example). If the short circuit voltage level measured during the initial shorting of the electrode 108 to the workpiece 112 is greater than the expected short circuit voltage level, the welding power supply 102 recognizes that there is too much voltage drop in the welding circuit, and the power supply can automatically adjust the both of the short circuit threshold voltage level 312 and the arcing threshold voltage level 314 upward accordingly. Alternatively, the welding power supply 102 could compare the short circuit voltage level measured during the initial shorting of the electrode 108 to the workpiece to the short circuit threshold voltage level 312 and if they are too close or the measured short circuit voltage exceeds the threshold, then the threshold voltages 312, 314 can be adjusted upward accordingly. In certain embodiments, the welding power supply 102 saves the short circuit threshold voltage level 312 and the arcing threshold voltage level 314 used during a prior welding operation for use during a subsequent welding operation. If the prior welding operation used very long welding cables and the subsequent welding operation used short welding cables, it would be desirable for the welding power supply 102 to adjust the threshold voltages 312, 314 downward. Thus, the welding power supply 102 can be configured to adjust both of the short circuit threshold voltage level 312 and the arcing threshold voltage level 314 upward or downward as appropriate, based on the welding voltage level detected during the initial shorting of the stick electrode 108 to the workpiece 112. The short circuit threshold voltage level 312 and the arcing threshold voltage level 314 can be adjusted by the same amount or by different amounts. In FIG. 5, both thresholds voltage levels 312, 314 have been adjusted upward by about 5 V.

The magnitude of the voltage adjustments applied to the short circuit threshold voltage level 312 and the arcing threshold voltage level 314 are based on the measured welding voltage level during the initial shorting of the electrode 108 to the workpiece 112. In the example of FIGS. 3-5, the measured short circuit voltage in FIGS. 4 and 5 is about 5 V higher than in the normal or expected set up shown in FIG. 3. Accordingly, as shown in FIG. 5, both thresholds voltage levels 312, 314 have been adjusted upward by the power supply 102 by about 5 V. With the threshold voltage levels 312, 314 adjusted based on the detected short circuit voltage level, the welding power supply 102 will activate the short circuit clearing routine whenever the measured welding voltage level is equal to or less than the adjusted short circuit threshold voltage level, and deactivate the short circuit clearing routine when the welding voltage level is equal to or greater than the adjusted arcing threshold voltage level, as shown in FIG. 5.

It is expected that short circuits between the electrode 108 and workpiece 112 will occur during active welding, and that the short circuit voltage level may change during welding. For example, an electrical connection might become loose or dirty resulting in an increase in the short circuit voltage level. The welding power supply 102 can update the short circuit voltage level (e.g., accumulate a running average of the short circuit voltage level) each time a short circuit is detected. If necessary, the welding power supply 102 can adjust both the short circuit threshold voltage level 312 and the arcing threshold voltage level 314 based on the updated or accumulated short circuit voltage level. The welding power supply 102 can also store the adjusted short circuit threshold voltage level 312 and the arcing threshold voltage level 314 for use during subsequent arc welding operations. This assumes that the welding set up will tend to remain the same between welding operations. The welding power supply 102 could also revert to stored default threshold voltage levels 312, 314 after a welding operation ends if desired.

In addition to adjusting the short circuit threshold voltage level 312 and the arcing threshold voltage level 314 based on the measured short circuit voltage level, other various welding voltage setpoints that are used by the power supply 102 could be adjusted as well.

As noted above, the welding power supply can determine when the short circuit condition 306 occurs and clears 310 from the measured welding voltage level, a calculated circuit impedance or resistance, and/or a calculated power level. Accordingly, instead of employing the threshold voltages 312, 313 for determining the shorting 306 and re-arcing 310 conditions as discussed above, the welding power supply 102 could use stored threshold resistance or power levels, and stored expected resistance or power levels for the short circuit condition. The resistance of the welding circuit ($R_C$) can be calculated by the welding power supply 102 from voltage and current measurements made when the electrode 108 is shorted to the workpiece 112, which removes a voltage drop across the welding arc 116, and with the welding current level relatively constant (to remove the impact of circuit inductance on the voltage measurement). With the resistance of the welding circuit ($R_C$) known, the welding power supply 102 could further determine the inductance of the welding circuit ($L_C$), based on the relationship of voltage to inductance and the rate of change of current (V=Ldi/dt). The inductance of the welding circuit ($L_C$) can be calculated from voltage measurements made while the welding current is changing at a known rate, such as when executing the short circuit clearing routine. The welding power supply 102 can calculate the impedance of the welding circuit, $Z_S$, during the welding operation from the equation: $Z_S=V_S/I_S$. $V_S$ and $I_S$ are the measured welding voltage and current, respectively. $Z_S$ is the sum of the impedances in the welding circuit, including an inductive reactance $X_C$ due to the cable inductance $L_C$ and the cable resistance $R_C$. Thus, $Z_S=X_C+R_C$. The inductive reactance, $X_C$, is equal to the cable inductance $L_C$ times the rate of change of the welding current $I_S$ divided by $I_S$: $X_C=(L_C)(dI_S/dt)/I_S$. Substituting for $X_C$ in the welding circuit impedance equation yields: $Z_S=(L_C)(dI_S/dt)/I_S+R_C$. Replacing $Z_S$ with $V_S/I_S$ provides the following: $V_S/I_S=(L_C)(dI_S/dt)/I_S+R_C$. It can be seen that once the welding circuit resistance level $R_C$ has been determined, welding voltage and current measurements can be made to determine the inductance level $L_C$. The resistance and inductance of the welding circuit can be used to characterize the welding circuit, such as via a rating or score, or to generate an alarm if the resistance and/or inductance are too high.

Figure 6:
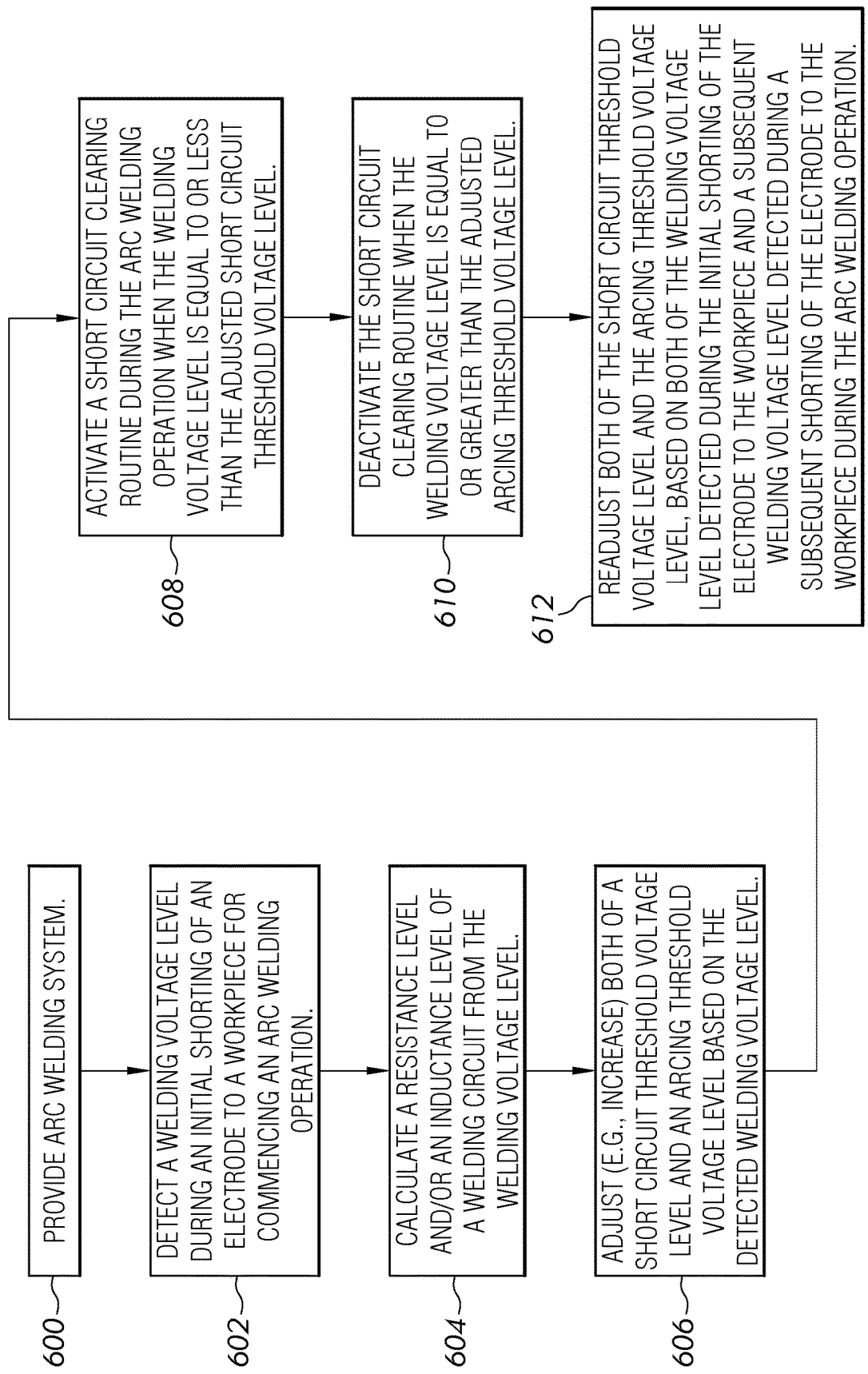
FIG. 6 is a flow diagram.

FIG. 6 provides a flow diagram of an example arc welding method. In step 600, the arc welding system is provided. In an example embodiment, the arc welding system can include a stick electrode holder, a stick electrode clamped by the stick electrode holder, and a welding power supply operatively connected to the stick electrode holder and configured to supply a welding current to the stick electrode through the stick electrode holder. The welding power supply can include a memory storing both of the short circuit threshold voltage level and the arcing threshold voltage level. The welding power supply detects a welding voltage level during an initial shorting of the electrode to a workpiece for commencing an arc welding operation (step 602). The welding power supply can calculate a resistance level and/or an inductance level of a welding circuit from the welding voltage level (step 604). The welding power supply adjusts both of the short circuit threshold voltage level and the arcing threshold voltage level based on the detected welding voltage level (step 606). The welding power supply activates a short circuit clearing routine during the arc welding operation when the welding voltage level is equal to or less than the adjusted short circuit threshold voltage level (step 608). The welding power supply deactivates the short circuit clearing routine when the welding voltage level is equal to or greater than the adjusted arcing threshold voltage level (step 610). The welding power supply can maintain a running average of the welding voltage during short circuits between the welding electrode and workpiece. Accordingly, the welding power supply can readjust both of the short circuit threshold voltage level and the arcing threshold voltage level based on both of the welding voltage level detected during the initial shorting of the electrode to the workpiece and a subsequent welding voltage level detected during a subsequent shorting of the electrode to the workpiece during the arc welding operation (step 612).

Figure 7:
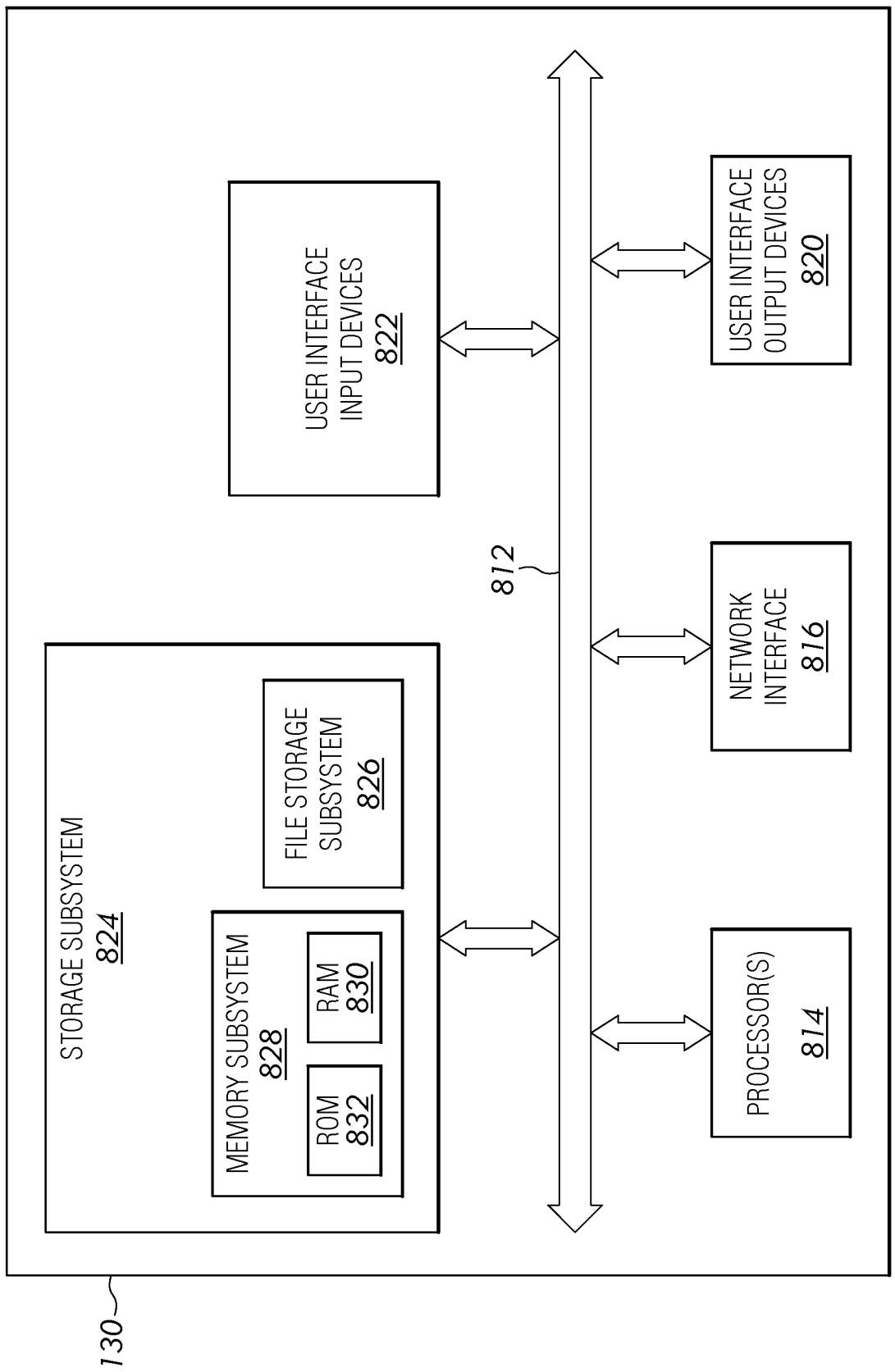
FIG. 7 is a block diagram of an example controller.

FIG. 7 illustrates an embodiment of an example controller 130 of the welding power supply 102. The controller 130 includes at least one processor 814 which communicates with a number of peripheral devices via bus subsystem 812. These peripheral devices may include a storage subsystem 824, including, for example, a memory subsystem 828 and a file storage subsystem 826, user interface input devices 822, user interface output devices 820, and a network interface subsystem 816. The input and output devices allow user interaction with the controller 130. The input and output devices can be embodied in the user interface 118 discussed above. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 130 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 130 to the user or to another machine or computer system.

Storage subsystem 824 provides a non-transitory, computer-readable storage medium that stores programming and data constructs that provide the functionality of some or all of the modules described herein. These software modules are generally executed by processor 814 alone or in combination with other processors. Memory 828 used in the storage subsystem can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, flash memory, or removable media cartridges. The modules implementing the functionality of certain embodiments may be stored by file storage subsystem 826 in the storage subsystem 824, or in other machines accessible by the processor(s) 814.

Bus subsystem 812 provides a mechanism for letting the various components and subsystems of the controller 130 communicate with each other as intended. Although bus subsystem 812 is shown schematically as a single bus, alternative embodiments of the bus subsystem may use multiple buses.

Many other configurations of the controller 130 are possible having more or fewer components than the controller depicted in FIG. 7.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An arc welding method, comprising the steps of:
providing a shielded metal arc welding system, including:
a stick electrode holder;
a stick electrode clamped by the stick electrode holder; and
a welding power supply operatively connected to the stick electrode holder and configured to supply a welding current to the stick electrode through the stick electrode holder, wherein the welding power supply includes a memory storing both of a short circuit threshold voltage level and an arcing threshold voltage level;
detecting, by the welding power supply, a welding voltage level during an initial shorting of the stick electrode to a workpiece for commencing an arc welding operation;
comparing the welding voltage level detected during the initial shorting of the stick electrode to the workpiece to the short circuit threshold voltage level or to an expected short circuit voltage level;
adjusting, by the welding power supply, both of the short circuit threshold voltage level and the arcing threshold voltage level upward based on the detected welding voltage level being greater than at least one of the short circuit threshold voltage level and the expected short circuit voltage level;
activating, by the welding power supply, a short circuit clearing routine during the arc welding operation when the welding voltage level is equal to or less than the adjusted short circuit threshold voltage level; and
deactivating, by the welding power supply, the short circuit clearing routine when the welding voltage level is equal to or greater than the adjusted arcing threshold voltage level.

2. The arc welding method of claim 1, further comprising the step of calculating a resistance level of a welding circuit from the welding voltage level.

3. The arc welding method of claim 2, further comprising the step of calculating an inductance level of the welding circuit from the welding voltage level.

4. The arc welding method of claim 1, further comprising the step of readjusting, by the welding power supply, both of the short circuit threshold voltage level and the arcing threshold voltage level, based on both of the welding voltage level detected during the initial shorting of the stick electrode to the workpiece and a subsequent welding voltage level detected during a subsequent shorting of the stick electrode to the workpiece during the arc welding operation.

5. An arc welding system, comprising:
a stick electrode holder comprising a clamp for holding a stick electrode; and
a welding power supply operatively connected to the stick electrode holder via a cable, wherein the welding power supply is configured to supply a welding current to the stick electrode through the stick electrode holder and cable,
wherein the welding power supply includes:
a memory storing both of a short circuit threshold voltage level and an arcing threshold voltage level;
a controller operatively connected to the memory, and
a voltage sensor, operatively connected to the controller, that measures a welding voltage level during an arc welding operation,
wherein the welding power supply is configured to:
detect the welding voltage level during an initial shorting of the stick electrode to a workpiece for commencing the arc welding operation;
compare the welding voltage level detected during the initial shorting of the stick electrode to the workpiece to the short circuit threshold voltage level or to an expected short circuit voltage level;
automatically upwardly adjust both of the short circuit threshold voltage level and the arcing threshold voltage level based on the welding voltage level detected during the initial shorting of the stick electrode to the workpiece being greater than at least one of the short circuit threshold voltage level and the expected short circuit voltage level;
activate a short circuit clearing routine during the arc welding operation when the welding voltage level is equal to or less than the adjusted short circuit threshold voltage level; and
deactivate the short circuit clearing routine when the welding voltage level is equal to or greater than the adjusted arcing threshold voltage level.

6. The arc welding system of claim 5, wherein the welding power supply is configured calculate a resistance level of a welding circuit from the welding voltage level.

7. The arc welding system of claim 6, wherein the welding power supply is configured to calculate an inductance level of the welding circuit from the welding voltage level.

8. The arc welding system of claim 5, wherein the welding power supply is configured to automatically readjust both of the short circuit threshold voltage level and the arcing threshold voltage level based on both of the welding voltage level detected during the initial shorting of the stick electrode to the workpiece and a subsequent welding voltage level detected during a subsequent shorting of the stick electrode to the workpiece during the arc welding operation.

9. An arc welding system, comprising: a welding torch; a consumable electrode extending from the welding torch; and a welding power supply operatively connected to the welding torch via a cable, wherein the welding power supply is configured to supply a welding current to the consumable electrode through the welding torch and cable, wherein the welding power supply includes: a memory storing a short circuit threshold voltage level or a short circuit threshold resistance level: a controller operatively connected to the memory, and a voltage sensor, operatively connected to the controller, that measures a welding voltage level during an arc welding operation, wherein the welding power supply is configured to: detect the welding voltage level during a shorting of the consumable electrode to a workpiece; automatically adjust the short circuit threshold voltage level or the short circuit threshold resistance level based on the welding voltage level detected during the shorting of the consumable electrode to the workpiece, wherein the welding power supply is configured to automatically increase the short circuit threshold voltage level or the short circuit threshold resistance level when the welding voltage level or a welding circuit resistance level detected during the shorting of the consumable electrode to the workpiece is higher than an expected level; and activate a short circuit clearing routine during the arc welding operation when the welding voltage level is equal to or less than the adjusted short circuit threshold voltage level or when the welding circuit resistance level is equal to or less than the adjusted short circuit threshold resistance level.

10. The arc welding system of claim 9, wherein the welding torch includes a clamp for holding the consumable electrode.

11. The arc welding system of claim 9, wherein the welding power supply is configured to calculate the welding circuit resistance level from the welding voltage level.

12. The arc welding system of claim 11, wherein the welding power supply is configured to calculate an inductance level of a welding circuit from the welding voltage level.

13. The arc welding system of claim 9, wherein the welding power supply is configured to automatically readjust the short circuit threshold voltage level or the short circuit threshold resistance level based on both of the welding voltage level detected during the shorting of the consumable electrode to the workpiece and a subsequent welding voltage level detected during a subsequent shorting of the consumable electrode to the workpiece during the arc welding operation.

* * * * *